United States Patent Office 3,014,062
Patented Dec. 19, 1961

3,014,062
CYCLIC CARBOXYLIC ACIDS AND ESTERS, AND A PROCESS FOR THE PRODUCTION OF CYCLIC CARBOXYLIC ACIDS AND/OR THEIR ESTERS FROM CYCLODODECATRIENES
Karl Erich Möller and Günther Wilke, Mulheim-Ruhr, Germany, assignors to Studiengesellschaft Kohle m.b.H., Mulheim-Ruhr, Germany
No Drawing. Filed Apr. 23, 1958, Ser. No. 730,242
Claims priority, application Germany Apr. 29, 1957
12 Claims. (Cl. 260—468)

This invention relates to new cyclic carboxylic acids and esters, and a process for the production of cyclic carboxylic acids and/or their esters from cyclododecatrienes.

German patent specification No. 942,987 discloses a process for the production of carboxylic acids from olefines and carbon monoxide in the presence of sulphuric acid of at least 90% concentration, together with anhydrous hydrogen fluoride by itself or with the addition of boron trifluoride as catalyst, in which the reaction is initially carried out without the addition of water in the liquid phase, whereafter the reaction product is taken up in water and worked up in known manner.

It has also been proposed, in Belgian patent specification No. 537,933, to produce carboxylic acids from olefines, preferably olefines branched at the double bond, and carbon monoxide at elevated pressure and in the presence of catalysts obtained by the reaction of boron trifluoride with water or with inorganic acids, the carboxylic acids being produced by initially carrying out the reaction without the addition of water in the presence of monohydroxy fluoboric acid or a complex compound thereof containing no or only a little water with phosphoric acid or sulphuric acid in the liquid phase at temperatures below 100° C. and only then adding the stoichiometric amount of water necessary for the reaction, it being possible for the catalyst obtained when the carboxylic acids separate out to be used again directly. These reactions can be carried out at pressures higher than 100 atm. for the purpose of suppressing certain olefinic transpositions.

Patent application No. 728,537, now U.S. Patent 2,967,873, entitled "Process for the Production of Aliphatic and Cycloaliphatic Monocarboxylic Acid Alkyl Esters" describes a process for the production of carboxylic acid esters from olefines with at least 6 carbon atoms, carbon monoxide and alcohols of low molecular weight by using acid catalysts containing boron fluoride in a complex bonding, in which in a first reaction stage olefines and carbon monoxide are reacted in the presence of catalyst mixtures comprising hydroxy and alkoxy fluoboric acid which contain at least one mol and at the most 2 mols of water plus alcohol per mol of boron fluoride, and in the second reaction stage, for separating ester and catalyst, alcohol is again added, preferably in a stoichiometric proportion.

Belgian patent specification No. 555,180, granted August 20, 1957, and other applications of the applicants have proposed processes for the production of cyclododecatri-(1,5,9)-enes concurrently with other cyclic hydrocarbons with at least 8 carbon atoms and at least two double bonds in the ring.

It has now been found that these cyclododecatrienes can be converted in a smooth reaction into $C_{13}$-monocarboxylic acids or into the esters of these carboxylic acids. In accordance with the invention, these cyclic carboxylic acids and/or their esters are obtained from cyclododecatrienes in the presence of acid catalysts, such as anhydrous sulphuric acid, hydrogen fluoride, or hydroxy fluoboric acids alone or in admixture with sulphuric acid or phosphoric acid, by adding-on carbon monoxide and the acid catalyst in a first stage of the process to the cyclododecatriene, and adding the stoichiometric quantity of water necessary for the carboxylic acid formation or the stoichiometric quantity of alcohol necessary for the ester formation in a second stage of the process. The infrared spectra of the compounds obtained show that no double bonds and no alkyl side chains are present in the individual molecules. Acid number, analysis of the elements present and determination of the molecular weight clearly show the compounds to be $C_{13}$ monocarboxylic acids, $C_{13}H_{20}O_2$, or as $C_{13}$-monocarboxylic acid esters. Fine fractionation of the substances shows that mixtures of isomeric compounds are present.

The catalysts already referred to are suitable for the production of the carboxylic acids. Particularly good results are obtained with boron fluoride dihydrate $(H_3O)(BF_2OH)$. For the production of the carboxylic acid esters, it is advantageous to use mixtures of hydroxy fluoboric acid $H(BF_3OH)$ and alkoxy fluoboric acids of the general formula $H(BF_3OR)$, in which R represents any desired hydrocarbon radical, preferably in a molar ratio of 1:0.66 to 1:4. Preferred alcohol components are methanol, ethanol and n-propanol. The catalyst which separates out in the second stage of the process can be used for a fresh mixture. In this way there is no difficulty in developing a continuous process.

The reaction can be carried out at temperatures between $-20$ and $+100°$ C., but it is advantageous to work between 20 and 60° C. The pressures used in the process of the invention can be chosen as desired: excellent results are obtained with pressure from 50 to 200 atm., but it is also possible without any disadvantage to use pressures of for example 300 or 500 atm.

The cyclododecatriene starting material can be diluted with the same volume of an inert solvent, for example with a saturated hydrocarbon such as n-hexane.

From the data of the reaction products it can be concluded that only one double bond of the cyclododecatriene is used for the carboxylic acid synthesis in the reaction the remaining two double bonds simultaneously disappearing with formation of a multicyclic system.

The $C_{13}$-monocarboxylic acids produced by the process of the invention are highly viscous crystal-clear liquids which are suitable for the production of special lubricating oils and greases.

The $C_{13}$-carboxylic acid esters have the same carbon structure as the $C_{13}$-carboxylic acids, as can be proved by esterification of the free acids by conventional processes. They have interesting properties as plasticisers. The products obtained from the esters by trans-esterification with high monohydric or polyhydric alcohols have the same properties. The esters and also the free acids are valuable intermediate products for organic syntheses.

$C_{13}$-monocarboxylic acids of the general formula $C_{13}H_{20}O_2$ in the form of highly viscous crystal-clear liquids with a B.P.$_{10mm}$ between 181 and 186° C., and $C_{13}$-monocarboxylic acid methyl esters with a molecular weight of 222, a B.P.$_{15mm}$ of 150–153° C. and a refractive index $n_D^{20} = 1.4968$–$1.4992$., are new compounds provided by the present invention.

The following examples further illustrate the invention.

Example 1

2 mols (= 324 g.) of cyclododecatriene were injected over a period of 30 minutes at a temperature of 50–54° C. into a 2-litre stainless steel magnetic stirrer-type autoclave containing 350 cc. of $(H_3O)(BF_3OH)$ with a density of 1.62 as catalyst and in which there was a carbon monoxide pressure of 200 atm. After a total reaction time of 2 hours, 500 cc. of hexane were added to the reaction product in the autoclave and the resulting mixture was emptied out. 2 mols of water were added: this caused the catalyst, ready for use in the next experiment to separate out. The small proportion of $BF_3$ still remaining in the lighter organic phase was washed out therefrom with 3 additional mols of water and the free carboxylic acids separated by way of their alkali metal salts from the neutral oil (27 g.)

The yield of $C_{13}$ monocarboxylic acids (B.P._{10mm.}= 181–186° C.) was 66%, based on the olefine used. In addition, 52 g. of carboxylic acids with a higher boiling point and solid at room temperature were formed.

The catalyst originating from the first experiment served under the same conditions for the reaction of three additional mols of cyclododecatriene. From the reaction product, likewise diluted again with hexane, the catalyst was separated out, ready for experiment 3, by adding the washing water originating from experiment 1. Working up yielded 60% of $C_{13}$-monocarboxylic acids, based on the initial olefine employed. In addition, there were obtained 85 g. of acids with a higher boiling point and 58 g. of neutral fractions.

The series of experiments was extended to a total of five operations without the catalyst having lost any of its effectiveness after these operations.

Example 2

1 mol (162 g.) of cyclododecatriene, diluted with the same volume of hexane, was injected into a 2-litre magnetic stirrer-type autoclave containing 250 cc. of catalyst with the composition of 1.5 mols of $H(BF_3OH)$ and 2.5 mols of $H(BF_3OCH_3)$, and in which there was a CO pressure of 50 atm. After a reaction time of 1 hour at a temperature of 4–8° C., the product was emptied out of the autoclave and another 0.5 litre of hexane was added, whereupon the catalyst was separated out by adding 1 mol of methanol. From the upper layer of the reaction product, the free carboxylic acids (4 g.) were separated by way of their alkali metal salts. These acids were saturated $C_{13}$-monocarboxylic acids (molecular weight 208).

The methyl esters of these $C_{13}$-acids, with a molecular weight of 222, were obtained as main product of the reaction, this corresponding to 57% of the theoretical. The higher-boiling fraction of the neutral oil obtained contained dimerisation products of the initial olefine and also the $C_{25}$-carboxylic acid methyl esters corresponding to the products. The separated catalyst was used again for two further experiments, in which similar results were produced.

Example 3

The cyclododecatriene was reacted using a catalyst having the composition of 1.5 mols of $(H_3O)(BF_3OH)$ and 1.5 mols of $(CH_3OH_2)(BF_3OCH_3)$. In this mixture, the ratio between $BF_3$ and water+alcohol was therefore 1:2. It was necessary to use a somewhat higher reaction temperature namely 32–35° C.

The procedure was that 260 cc. of this catalyst were placed in a 2-litre magnetic stirrer-type autoclave, and 1 mol of cyclododecatriene, diluted with the same volume of hexane, was injected at a CO pressure of 50 atm. After a reaction time of 3 hours, the product was removed from the autoclave and diluted with 0.5 litre of hexane. This caused most of the catalyst to separate out; the remainder was separated out by adding 0.5 mol of methanol.

Working up carried out in the usual way yielded only traces of carboxylic acids and also 40% of methyl esters of the $C_{13}$-acids, based on the amount of initial olefine. 26% of the olefine had been isomerised.

The recovered catalyst was used in a second experiment under the same condition. It could be separated out from the reaction mixture again by adding methanol and could be used afresh in two further experiments without reduction in its activity. In Experiment 2, the yields based on the olefine introduced were 52% of methyl esters of $C_{13}$-acids and 9% of $C_{13}$-acids themselves.

The higher-boiling fractions combined from all experiments contained dimerisation products of the initial olefine and also the methyl esters of the $C_{25}$-carboxylic acids resulting therefrom.

Example 4

A procedure as described in Example 3 was used, but light benzene (boiling range 60–100° C.) was used as solvent, and the carbon monoxide pressure was increased to 300 atm. After analogous working up, the $C_{13}$-carboxylic acids and the $C_{13}$-carboxylic acid methyl esters were obtained in yields of 10% and 57% respectively.

Example 5

The procedure described in Example 3 was used, but commercial n-heptane was used as solvent and 250 cc. of a catalyst of the composition:

0.5 mol of $(H_3O)(BF_3OH)$ and 1 mol of $(CH_3OH_2)(BF_3OCH_3)$ was used.

The reaction took place at a carbon monoxide pressure of 250 atm. For separating out the small proportion of carboxylic acids formed in addition to the methyl esters, the reaction product was passed through a column filled with an ion exchanger of the Amberlite IRA–401 type made by Rohm & Haas Co., i.e. a basic anion exchange resin such as that having quaternary amine groups. The carboxylic acids held by the ion exchanger were thereafter dissolved out with methanolic potassium hydroxide solution and the potassium salt acidified with hydrochloric acid to liberate the free acid. 8% of the theoretical of $C_{13}$-carboxylic acids were formed. From the neutral oil, it was possible to isolate 63% of the theoretical of $C_{13}$-carboxylic acid methyl esters after the hexane had been distilled off.

What we claim is:

1. Process for the production of multicyclic $C_{13}$ monocarboxylic acids from cyclododecatri-(1,5,9)-enes which comprises reacting a cyclododecatri-(1,5,9)-ene with carbon monoxide under positive pressure in the presence of an acid catalyst selected from the group consisting of anhydrous sulfuric acid, hydrogen fluoride, phosphoric acid, hydroxy fluoroboric acids and mixtures thereof in a first stage and converting the compound thereby formed in a second stage by the addition of the stoichiometric amount of water necessary to form the corresponding carboxylic acid.

2. Process for the production of multicyclic $C_{13}$ monocarboxylic acid esters from cyclododecatri-(1,5,9)-enes which comprises reacting a cyclododecatri-(1,5,9)-ene with carbon monoxide under positive pressure in the presence of a mixture of hydroxy and lower alkoxy fluoroboric acids as catalyst in a first stage and converting the compound thereby formed in a second stage by the addition of the stoichiometric amount of lower alkanol necessary to form the corresponding carboxylic acid ester.

3. Process for the production of cyclic $C_{13}$ monocarboxylic acids from cyclododecatri-(1,5,9)-ene which comprises reacting cyclododecatri-(1,5,9)-ene with carbon monoxide under positive pressure from 50 to 500 atmospheres in the presence of an acid catalyst selected from the group consisting of anhydrous sulfuric acid, hydrogen fluoride, phosphoric acid, hydroxy fluoroboric acids and mixtures thereof in a first stage at a temperature of from −20 to +100° C. and converting the compound thereby formed in a second stage by the addition of the stoichiometric amount of water necessary to form the corresponding carboxylic acid.

4. Process for the production of cyclic $C_{13}$ monocarboxylic lower alkyl esters from cyclododecatri-(1,5,9)-ene which comprises reacting cyclododecatri-(1,5,9)-ene with carbon monoxide under positive pressure from 50 to 500 atmospheres in the presence of a mixture of hydroxy and lower alkoxy fluoroboric acids as catalyst in a first stage at a temperature of from −20 to +100° C. and converting the compound thereby formed in a second stage by the addition of the stoichiometric amount of lower alkanol necessary to form the corresponding carboxylic lower alkyl ester.

5. Process according to claim 2 wherein said lower alkanol is selected from the group consisting of methanol, ethanol and n-propanol.

6. A $C_{13}$ monocarboxylic acid of the formula $C_{13}H_{20}O_2$ in the form of a highly viscous crystal clear liquid having a $B.P._{10mm.}$ of 181–186° C. prepared by reacting cyclododecatri-(1,5,9)-ene with carbon monoxide under positive pressure from 50 to 500 atmospheres in the presence of an acid catalyst selected from the group consisting of anhydrous sulfuric acid, hydrogen fluoride, phosphoric acid, hydroxy fluoroboric acids and mixtures thereof in a first stage at a temperature of from −20 to +100° C. and converting the compound thereby formed in a second stage by the addition of the stoichiometric amount of water necessary to form the corresponding carboxylic acid.

7. A $C_{13}$ monocarboxylic methyl ester having a molecular weight of 222, a $B.P._{15\ mm.}$ of 150–153° C. and a refractory index $n_D^{20}$ of 1.4968 to 1.4992 prepared by reacting cyclododecatri-(1,5,9)-ene with carbon monoxide under positive pressure from 50 to 500 atmospheres in the presence of a mixture of hydroxy and lower alkoxy fluoroboric acids as catalyst in a first stage at a temperature of from −20 to +100° C. and converting the compound thereby formed in a second stage by the addition of the stoichiometric amount of methanol necessary to form the corresponding carboxylic lower alkyl ester.

8. Process according to claim 1 characterized in that said process is carried out at a temperature of from −20 to +100° C.

9. Process according to claim 1 characterized in that the starting cyclododecatriene is diluted with a substantially equal volume of a chemically inert solvent.

10. Process according to claim 9 characterized in that said solvent is a member selected from the group consisting of hexane, light benzene and n-heptane.

11. Process according to claim 2 characterized in that any carboxylic acids are separated from the reaction products by way of their alkali metal salts.

12. Process according to claim 2 characterized in that any carboxylic acids are separated from the reaction product by passing said reaction product in contact with an ion exchanger and thereafter treating the same with methanolic potassium hydroxide solution.

References Cited in the file of this patent

UNITED STATES PATENTS

| | | |
|---|---|---|
| 2,253,525 | Loder | Aug. 26, 1941 |
| 2,448,368 | Gresham et al. | Aug. 31, 1948 |
| 2,688,627 | Cohen et al. | Sept. 7, 1954 |
| 2,864,858 | Schneider | Dec. 16, 1958 |

FOREIGN PATENTS

| | | |
|---|---|---|
| 942,987 | Germany | May 9, 1956 |

OTHER REFERENCES

Willemart: Bull. Soc. Chim. France (1947), pgs. 152–7.
Rescueil Des Brevets D'Invention, pgs. 856–7, No. 537,933, May 5, 1955.